US012500355B2

(12) United States Patent
Lin et al.

(10) Patent No.: US 12,500,355 B2
(45) Date of Patent: Dec. 16, 2025

(54) ANTENNA MODULE AND COMMUNICATION DEVICE USING THE ANTENNA MODULE

(71) Applicant: MEDIATEK INC., Hsin-Chu (TW)

(72) Inventors: Wun-Jian Lin, Hsinchu (TW); Chung-Hsin Chiang, Hsinchu (TW); Shyh-Tirng Fang, Hsinchu (TW); Shih-Huang Yeh, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 121 days.

(21) Appl. No.: 18/116,251

(22) Filed: Mar. 1, 2023

(65) Prior Publication Data

US 2023/0291127 A1 Sep. 14, 2023

Related U.S. Application Data

(60) Provisional application No. 63/318,800, filed on Mar. 11, 2022.

(51) Int. Cl.

*H01Q 21/06* (2006.01)
*H01Q 21/28* (2006.01)

(52) U.S. Cl.

CPC ........... *H01Q 21/28* (2013.01); *H01Q 21/065* (2013.01)

(58) Field of Classification Search

CPC .... H01Q 21/0025; H01Q 21/06; H01Q 21/28; H01Q 25/00

See application file for complete search history.

(56) References Cited

U.S. PATENT DOCUMENTS

| | | | | |
|---|---|---|---|---|
| 9,905,922 | B2 * | 2/2018 | Lee | H01Q 1/243 |
| 10,170,838 | B2 * | 1/2019 | Garcia | H01L 23/66 |
| 10,923,832 | B2 * | 2/2021 | Fan | H01Q 5/42 |
| 11,881,630 | B2 * | 1/2024 | Khripkov | H01Q 1/243 |
| 2008/0272955 | A1 | 11/2008 | Yonak | |
| 2017/0222325 | A1 | 8/2017 | Sudo | |
| 2017/0222333 | A1 | 8/2017 | Sudo | |
| 2019/0165454 | A1 | 5/2019 | Lee | |
| 2020/0243983 | A1 | 7/2020 | Loesch | |

FOREIGN PATENT DOCUMENTS

| | | | |
|---|---|---|---|
| TW | 202114287 | A | 4/2021 |
| WO | 2021/251515 | A1 | 12/2021 |

OTHER PUBLICATIONS

R. J. Evans et al., Consumer Radar: Technology and Limitations, 2013, pp. 21-26, IEEE, XP032519500.

* cited by examiner

*Primary Examiner* — Hasan Islam
(74) *Attorney, Agent, or Firm* — Winston Hsu

(57) ABSTRACT

An antenna module, comprising: a substrate; at least one first antenna array, located on the substrate, comprising at least one first antenna and having a first maximum radiation direction; and at least one second antenna array, located on the substrate, comprising at least one second antenna and having a second maximum radiation direction. A communication device using the antenna module is also disclosed.

14 Claims, 11 Drawing Sheets

Example 1

Example 2

Example 3

ANTENNA MODULE AND COMMUNICATION DEVICE USING THE ANTENNA MODULE

CROSS REFERENCE TO RELATED APPLICATIONS

This application claims the benefit of U.S. Provisional Application No. 63/318,800, filed on Mar. 11, 2022. The content of the application is incorporated herein by reference.

BACKGROUND

For a conventional antenna module, the maximum radiation directions of the antenna arrays are always limited, thus the overall performance of the antenna module is limited since signals come from different directions. Further, the traces between different groups of antennas of the conventional antenna module are complex, thus may cause signal loss and a high cost. Therefore, an antenna module which has more than one maximum radiation directions via simplified structures is needed.

SUMMARY

One objective of the present application is to provide an antenna module which can provide multi maximum radiation directions and has a lower signal loss and a lower cost.

Another objective of the present application is to provide a communication device which has an antenna module which can provide multi maximum radiation directions and has a lower signal loss and a lower cost.

One embodiment of the present application discloses an antenna module, comprising: a substrate; at least one first antenna array, located on the substrate, comprising at least one first antenna and having a first maximum radiation direction; and at least one second antenna array, located on the substrate, comprising at least one second antenna and having a second maximum radiation direction.

Another embodiment of the present application discloses a communication device, comprising: an antenna module, comprising a connector; a communication circuit, coupled to the antenna module, configured to receive signals or to transmit signals by the antenna module; and a power supplying device, coupled to the antenna module via the connector, configured to provide power to the antenna module. The antenna module comprises: a substrate; at least one first antenna array, located on the substrate, comprising at least one first antenna and having a first maximum radiation direction; and at least one second antenna array, located on the substrate, comprising at least one second antenna and having a second maximum radiation direction.

In view of above-mentioned embodiments, the antenna module provided by the present application can have multi maximum radiation directions via antenna modules provided on a single substrate. Accordingly, the size and the cost the antenna module can be reduced, and signal loss caused by traces can be decreased.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term “first”, “second”, “third” in following descriptions are only for the purpose of distinguishing different one elements, and do not mean the sequence of the elements. For example, a first device and a second device only mean these devices can have the same structure but are different devices.

Figure 1:
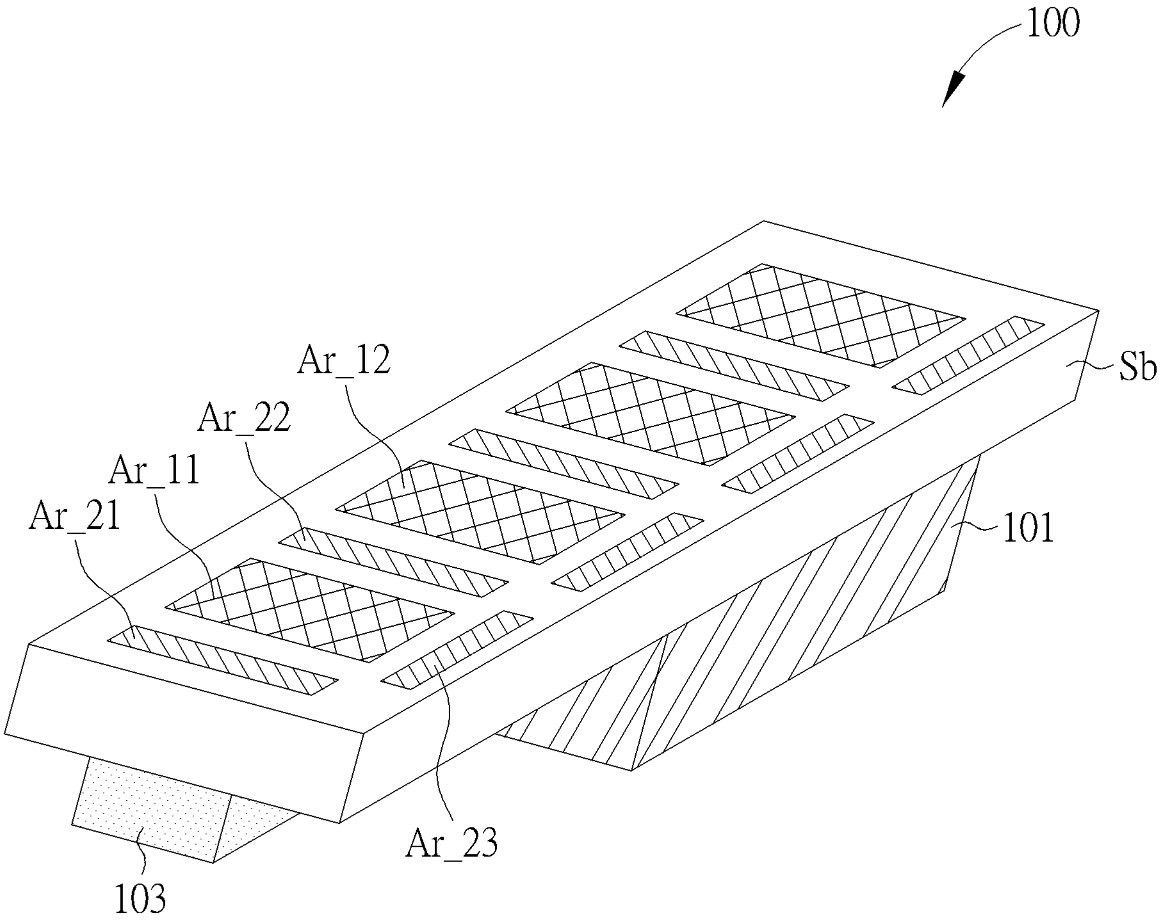
FIG. 1 is a stereogram illustrating an antenna module according to one embodiment of the present application.
Figure 2:
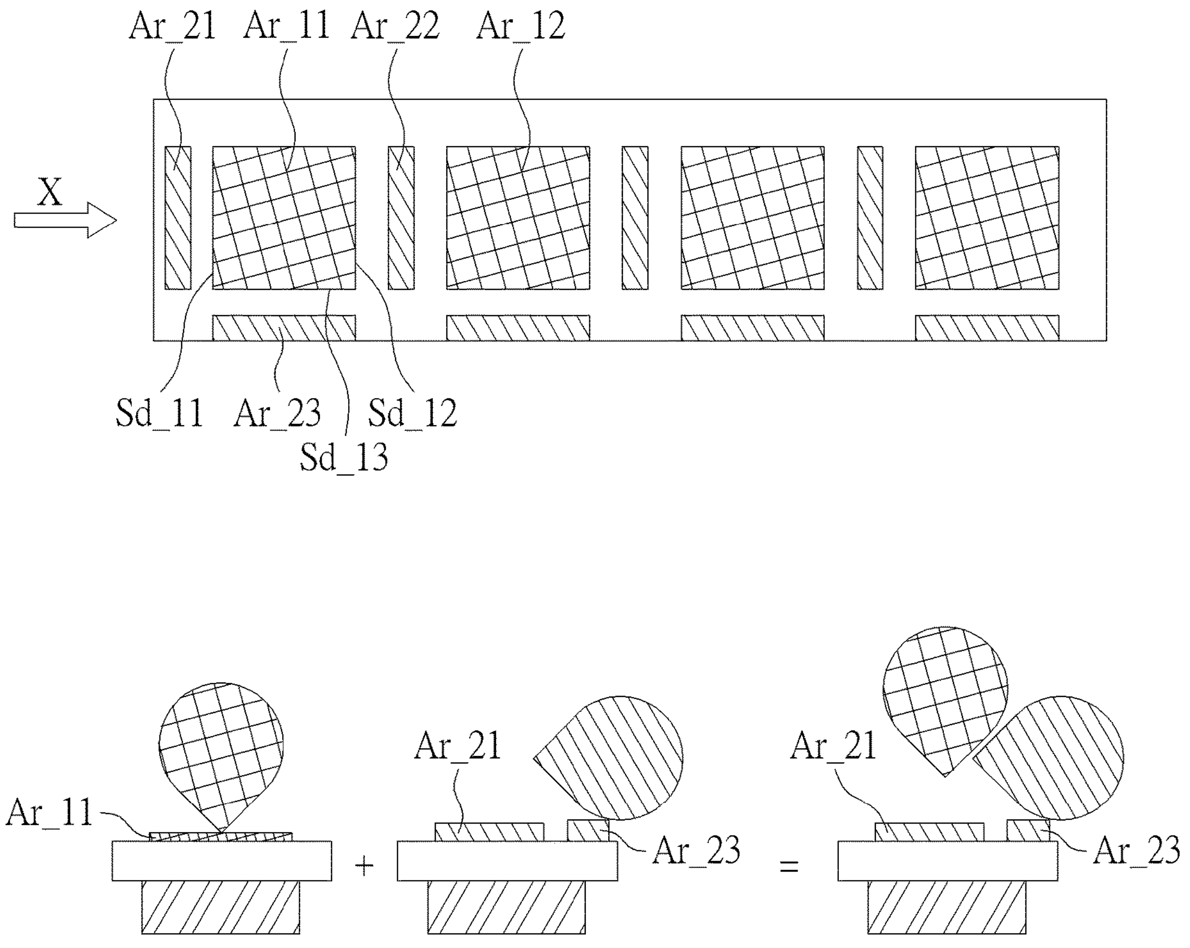
FIG. 2 is a top view diagram and a side view diagram of the antenna module illustrated in FIG. 1.

FIG. 1 is a stereogram illustrating an antenna module 100 according to one embodiment of the present application. FIG. 2 is a top view diagram and a side view diagram of the antenna module 100 illustrated in FIG. 1. Specifically, the upper diagram of FIG. 2 is a top view of the antenna module 100 illustrated in FIG. 1, and the lower diagram of FIG. 2 is a side view viewed from the X direction of the upper diagram in FIG. 2. Please also refer to FIG. 2 while referring to FIG. 1, to understand the concepts of the present application for more clarity.

As shown in FIG. 1, the antenna module 100 comprises a substrate Sb, at least one first antenna array (two first antenna arrays Ar_11, Ar_12 are used as examples for explaining), and at least one second antenna array (three second antenna arrays Ar_21, Ar_22, Ar_23 are used as examples for explaining). In one embodiment, the substrate Sb is a PCB (Printed Circuit Board), but it can be any other type of substrate. Each of the first antenna arrays Ar_11, Ar_12 is located on the substrate Sb, comprises at least one first antenna, and has a first maximum radiation direction. Each of the second antenna arrays Ar_21, Ar_22, Ar_23 is located on the substrate Sb, comprises at least one second antenna, and has a second maximum radiation direction.

The second antenna array may be parallel with a side of the first antenna array. For example, as shown in the upper diagram of FIG. 2, the second antenna arrays Ar_21, Ar_22 are respectively parallel with sides Sd_11, Sd_12 of the first antenna array Ar_11. In another embodiment, the antenna module 100 comprises a plurality of the first antenna arrays, and the second antenna array is located between the first antenna arrays. For example, as shown in the upper diagram of FIG. 2, the second antenna array Ar_22 is provided between the first antenna arrays Ar_11, Ar_12.

In one embodiment, the antenna module 100 comprises a plurality of second antenna arrays, wherein one of the second antenna array is parallel with a first side of the first antenna array and another of the second antenna array is parallel with a second side of the first antenna array, wherein the first side and the second side are perpendicular with each other. For example, the second antenna array is parallel with the side Sd_11 (the first side), and the second antenna array Ar_23 is parallel with the side Sd_13 (the second side) which is perpendicular with the side Sd_11. Additionally, the first antenna array may be located between the second antenna arrays. For example, the first antenna array Ar_11 is located between the second antenna arrays Ar_21, Ar_22.

As above-mentioned, the first arrays Ar_11, Ar_12 have a first maximum radiation direction and the second antenna arrays Ar_21, Ar_22, Ar_23 have a second maximum radiation direction. In one embodiment, the first arrays Ar_11, Ar_12 are broad side antenna arrays and the second antenna arrays Ar_21, Ar_22 are end-fire antenna arrays. Accordingly, as shown in the lower diagram of FIG. 2, the first maximum radiation direction is perpendicular with the substrate Sb and the second maximum radiation direction is parallel with the substrate Sb. Since the antenna module 100 comprises first arrays Ar_11, Ar_12 and the second antenna arrays Ar_21, Ar_22, Ar_23 which are provided on the substrate Sb, the antenna module 100 can have two maximum radiation directions rather than only one maximum radiation direction.

However, the first maximum radiation direction and the second maximum radiation direction can be any two different directions. In one embodiment, the first maximum radiation direction and the second maximum radiation direction can be changed via changing designs of the first antenna and the second antenna, or via changing tilting angles of the first antenna array Ar_11, Ar_12 and the second antenna array Ar_21, Ar_22, Ar_23.

The antenna module 100 may be further connected to other components. For example, in the embodiment of FIG. 1, the antenna module 100 is coupled to a communication circuit 101 (e.g., an RFIC) and a connector 103. The communication circuit 101, which is molding in the embodiment of FIG. 1, may be configured to transmit/receive signals, or configured to up-convert or to down-convert a signal frequency. In the embodiment of FIG. 1, the communication circuit 101 is molding by protection material. The connector 103 may be configured to receive power or control signals for the first antenna arrays Ar_11, Ar_12, the second antenna arrays Ar_21, Ar_22, Ar_23 or the communication circuit 101.

In one embodiment, the first antenna array has a combined polarization which has two directions of polarization in a single one of the first antenna array, and the second antenna array has two directions of polarization in two separate ones of the second antenna arrays. For example, in the embodiment of FIG. 1, the first antenna array Ar_11 provides vertical polarization and horizontal polarization. Also, in the embodiment of FIG. 1, the second antenna array Ar_21 provides only the vertical polarization and the second antenna array Ar_23 provides only the horizontal polarization.

Figure 3:
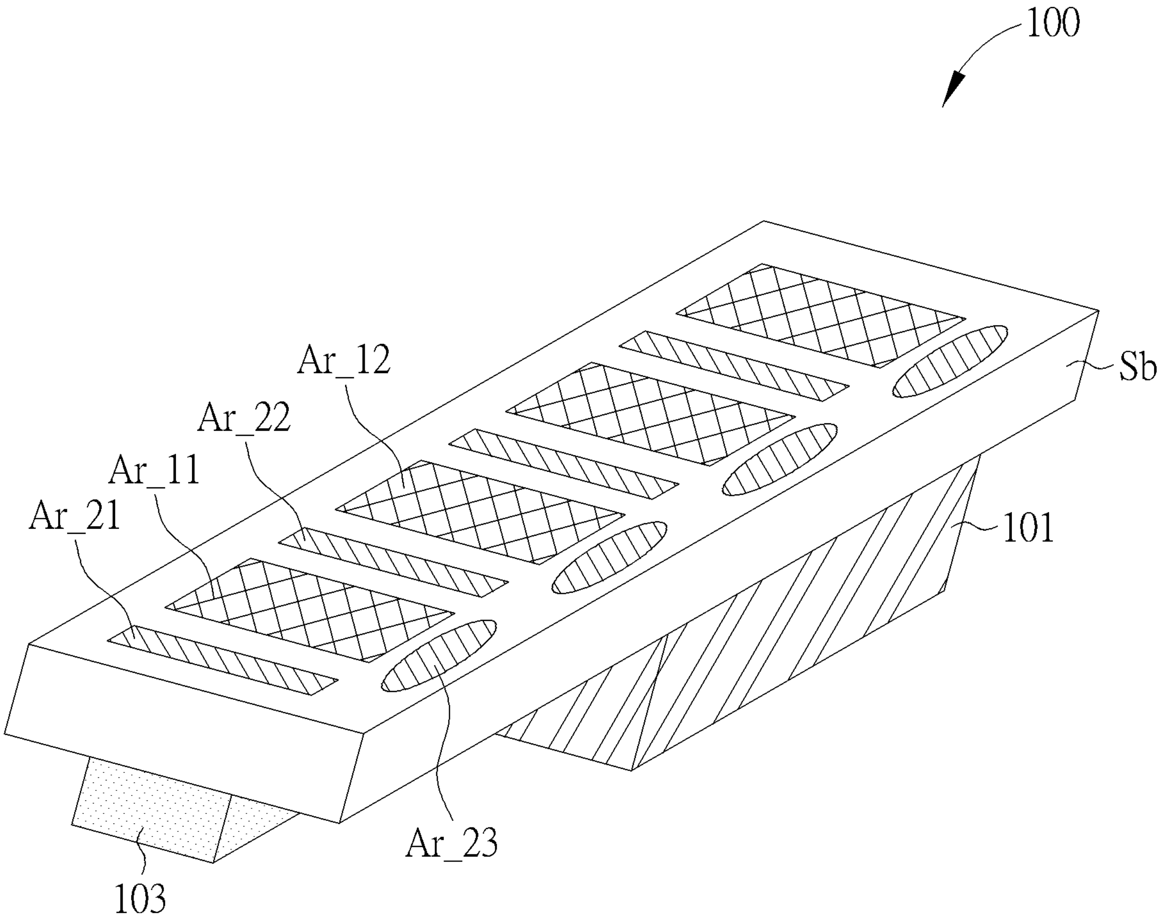
FIG. 3 and FIG. 4 are stereograms illustrating antenna modules according to different embodiments of the present application.
Figure 4:
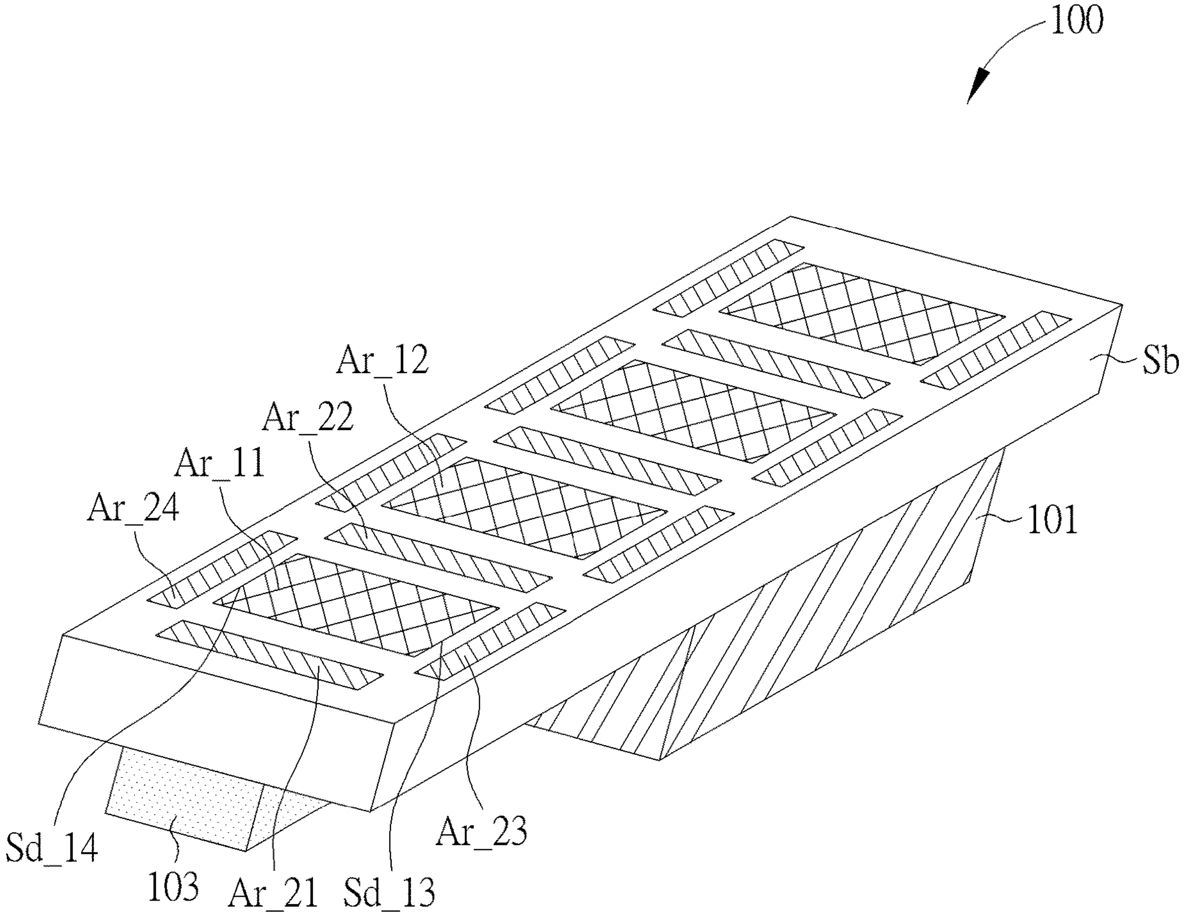

The arrangement, size, and locations of the first antenna arrays and the second antenna arrays are not limited to the embodiments illustrated in FIG. 1 and FIG. 2. FIG. 3 and FIG. 4 are stereograms illustrating antenna modules according to different embodiments of the present application. In the embodiment of FIG. 3, some second antenna arrays are changed from rectangles to ovals. For example, the second antenna array Ar_23 is changed from a rectangle to an oval. In the embodiment of FIG. 4, the antenna module further comprises a second antenna array AR_24. In such case, the second antenna array AR_24 is parallel with a side Sd_14 of the first antenna array AR_11, and the second antenna array AR_23 is parallel with a side Sd_13 of the first antenna array AR_11. The sides Sd_13, Sd_14 are parallel with each other.

Figure 5:
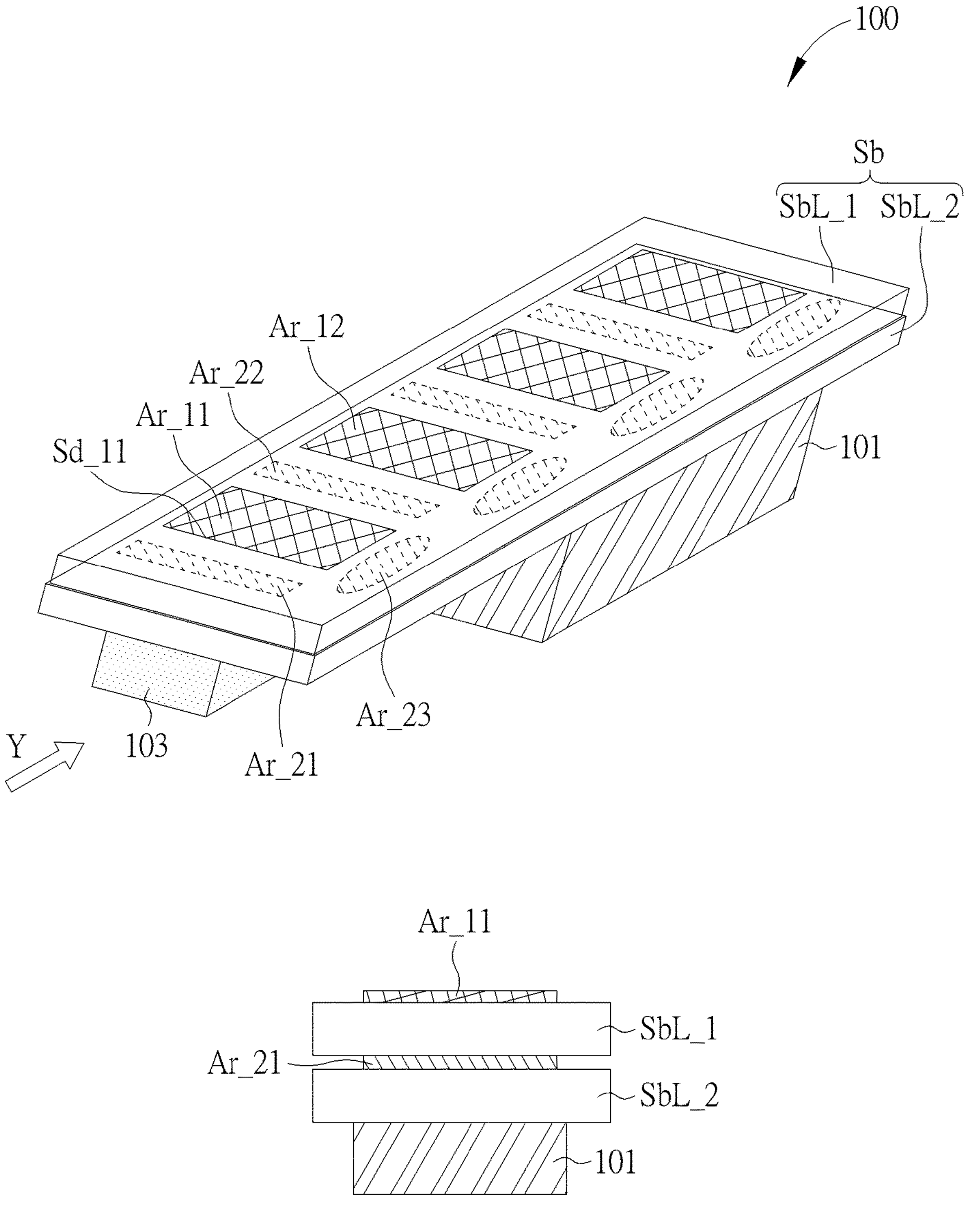
FIG. 5 illustrates a stereogram and a side view of an antenna module according to another embodiment of the present application.

FIG. 5 illustrates a stereogram and a side view of an antenna module according to another embodiment of the present application. Please note, in the embodiment of FIG. 5, some of the second antenna are ovals shown in FIG. 3, but can be replaced by other shapes, such as the rectangles shown in FIG. 1. The upper diagram of FIG. 5 is a stereogram illustrating an antenna module according to one embodiment of the present application. Also, a the lower diagram of FIG. 5 is a side view viewed from the Y direction of the upper diagram in FIG. 5. In the embodiment of FIG. 5, the substrate Sb comprises a first layer SbL_1 and a second layer SbL_2 below the first layer SbL_1. The first antenna arrays Ar_11, Ar_12 are located on the first layer SbL_1 and the second antenna arrays Ar_21, Ar_22, Ar_23 are located on the second layer SbL_2.

In such case, a projection image of the second antenna array may be parallel with a side of the first antenna array. For example, a projection image of the second antenna array Ar_21, which is projected to the first layer SbL_1, is parallel with a side Sd_11 of the first antenna array Ar_11. Further, a projection image of the second antenna array may be located between the first antenna arrays. For example, a projection image of the second antenna array Ar_22, which is projected to the first layer SbL_1, is located between the first antenna arrays Ar_11, Ar_12. Additionally, a projection image of the first antenna array may be located between the second antenna arrays. For example, a projection image of the first antenna array Ar_11, which is projected to the second layer SbL_2, is located between the second antenna arrays Ar_21, Ar_22.

Figure 6:
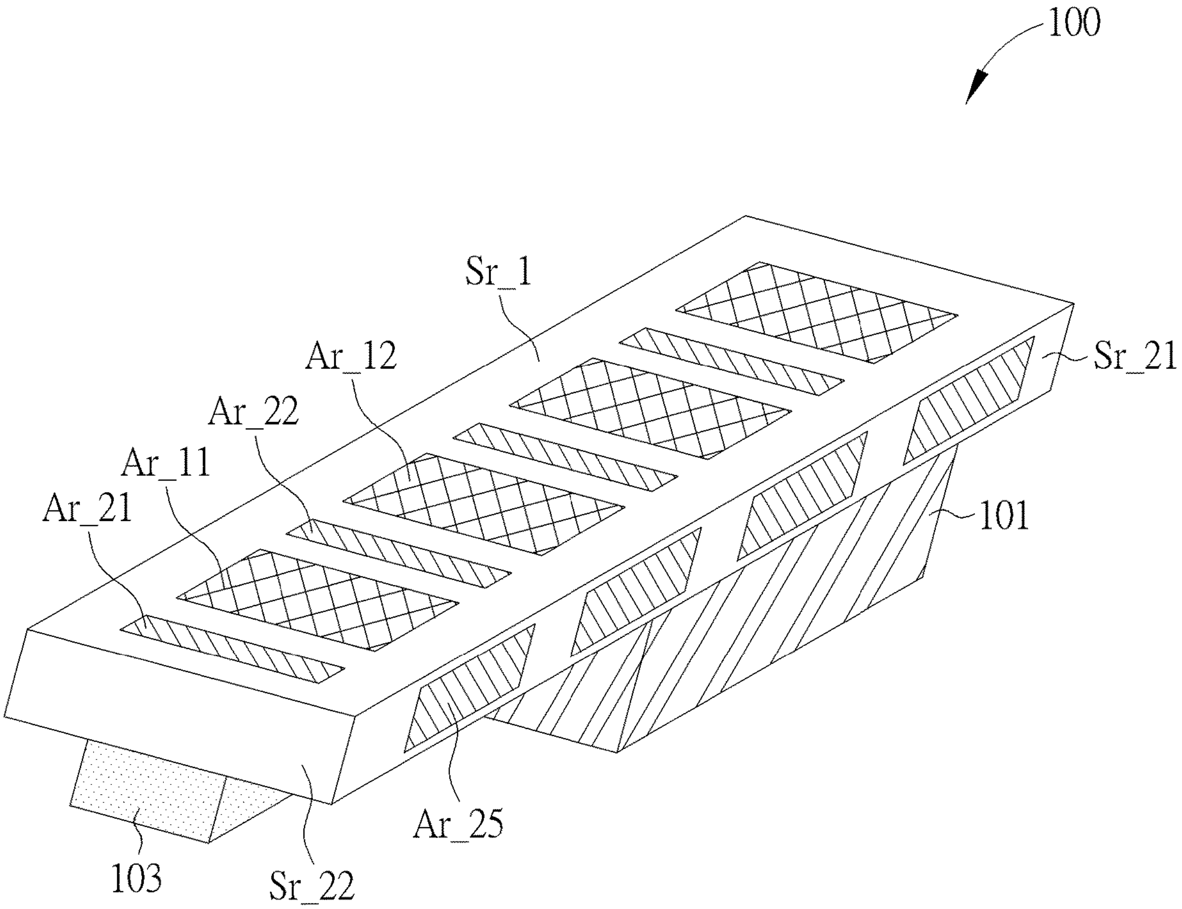
FIG. 6 and FIG. 7 are stereograms illustrating antenna modules according to different embodiments of the present application.
Figure 7:
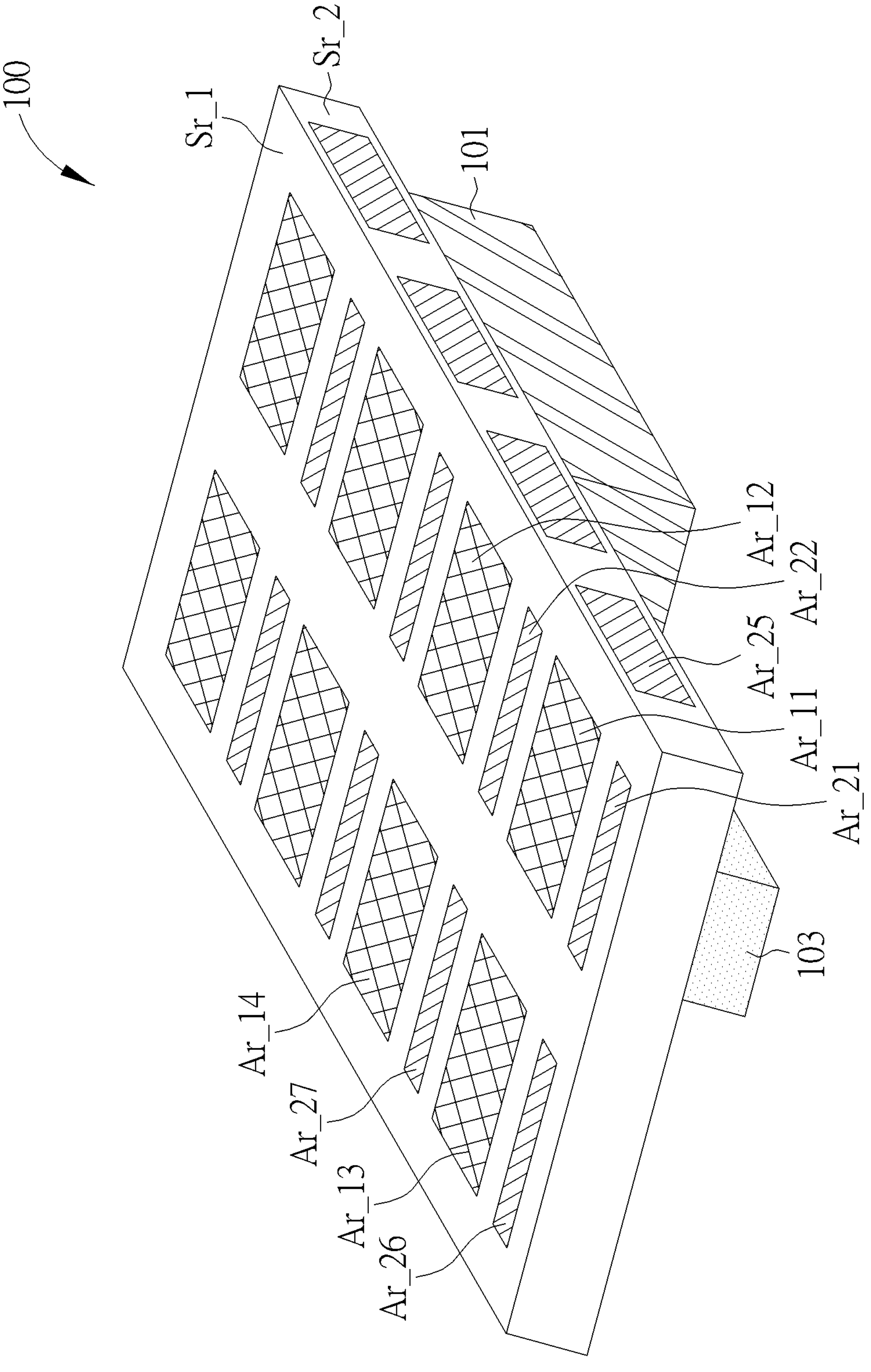

FIG. 6 and FIG. 7 are stereograms illustrating antenna modules according to different embodiments of the present application. In the embodiment of FIG. 6, the substrate Sb comprises a first surface Sr_1 and a second surface Sr_21. A maximum length of the first surface Sr_1 is identical with a maximum length of the second surface Sr_21. Normal vectors of the first surface Sr_1 and the second surface Sr_21 may be different. In such case, the first antenna array may be located on the first surface Sr_1, and the second antenna array are located on at least one of the first surface Sr_1 and the second surface Sr_21. For example, the first antenna arrays Ar_11, Ar_12 and the second antenna arrays Ar_21, Ar_22, Ar_23 are located on the first surface Sr_1, and the second antenna array Ar_25 is located on the second surface Sr_21. In one embodiment, the substrate Sb further comprises another second surface Sr_22. At least one second antenna array can be provided on the second surface Sr_22. A maximum length of the first surface Sr_1 is longer than a maximum length of the second surface Sr_22. Normal vectors of the first surface Sr_1 and the second surface Sr_22 may be different.

In above-mentioned embodiments, the first antenna arrays form a single line. However, in one embodiment, the first antenna arrays may form at least two lines. For example, as shown in FIG. 7, the first antenna arrays Ar_11, Ar_12 on the first surface Sr_1 form one line and the first antenna arrays Ar_13, Ar_14 on the first surface Sr_1 form another line. In such case, the second antenna arrays on the first surface Sr_1 form at least two lines and at least one of the second antenna array is located between two of the first antenna arrays. For example, the second antenna arrays Ar_21, Ar_22 on the first surface Sr_1 form one line and the second antenna arrays Ar_26, Ar_27 on the first surface Sr_1 form another line. Also, the second antenna array Ar_22 is located between the first antenna arrays Ar_11, Ar_12, and the second antenna array Ar_27 is located between the first antenna arrays Ar_13, Ar_14. It will be appreciated that the concepts disclosed in FIG. 7 can be applied to the embodiment of FIG. 1.

Figure 8:
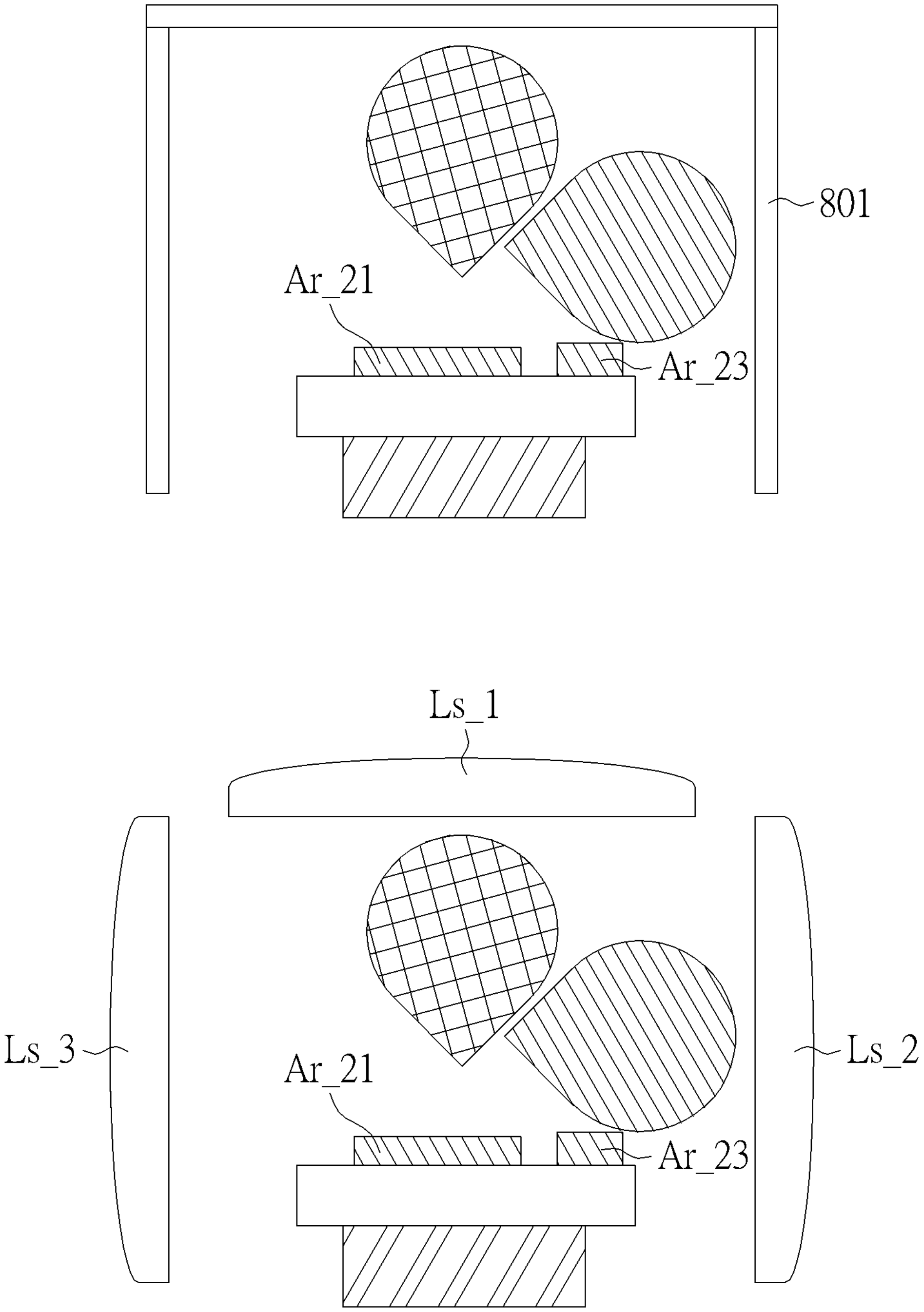
FIG. 8 is a schematic diagram illustrating auxiliary structures for the antenna module, according to embodiments of the present application.

Some auxiliary structures can be provided for improving the performance of the antenna module 100. FIG. 8 is a schematic diagram illustrating auxiliary structures for the antenna module 100, according to embodiments of the present application. Please note, the lower diagram of FIG. 2 is used as an example for explaining the embodiment of FIG. 8. However, the auxiliary structures can be applied in other embodiments disclosed in the present application.

In the upper diagram of FIG. 8, the antenna module 100 further comprises a metamaterial surface 801 covering the first antenna array and the second antenna array. The metamaterial surface 801 can enhance gains of the first antenna array and the second antenna array. In the lower diagram of FIG. 8, the antenna module 100 further comprises at least one lens (three lenses LS_1, LS_2, LS_3 in this example) covering the first antenna array and the second antenna array. The lenses LS_1, LS_2, LS_3 can enhance gains of the first antenna array and the second antenna array as well.

Figure 9:
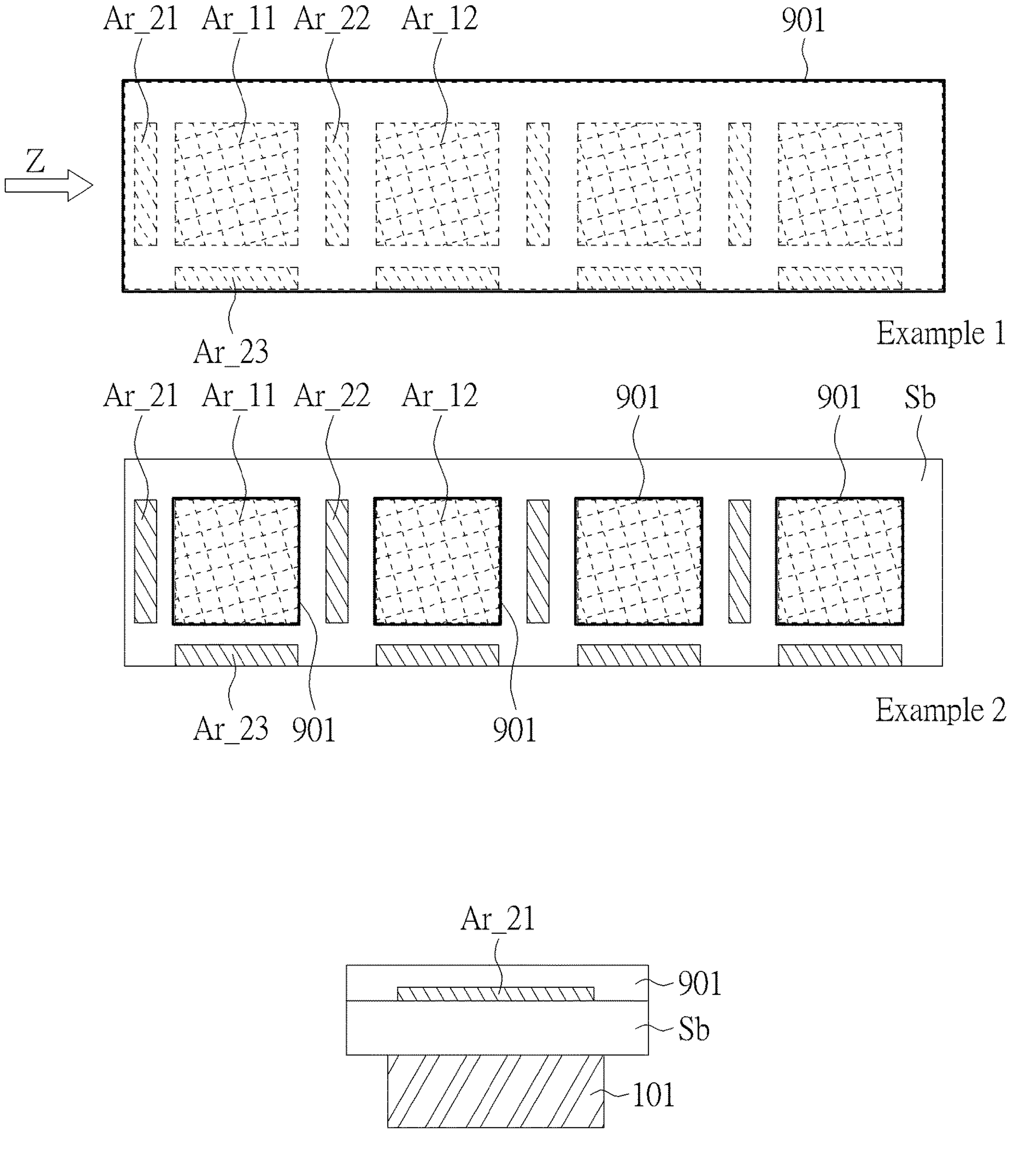
FIG. 9 is a schematic illustrating a molding layer is provided for the antenna module, according to one embodiment of the present application.

In one embodiment, the antenna module 100 further comprises a molding layer, which covers at least one of the first antenna array and the second antenna array, or covers all of a surface of the substrate Sb. The molding layer can tune the impedance or enhances gains of the first antenna arrays and the second antenna arrays. FIG. 9 is a schematic illustrating a molding layer is provided for the antenna module, according to one embodiment of the present application. The upper diagram of FIG. 9 illustrates top view of two examples of the molding layer. Also, the lower diagram of FIG. 9 is a side view viewed from the Z direction of the upper diagram of FIG. 9.

In the example 1 of FIG. 9, the molding layer 901 covers all of a surface of the substrate 901, thus also covers all first antenna arrays and second antenna arrays. Oppositely, in the example 2 of FIG. 9, the molding layer 901 only covers the first antenna arrays. In another embodiment, the molding layer 901 only covers at least one second antenna array, or only covers at least one first antenna array and at least one second antenna array.

Figure 10:
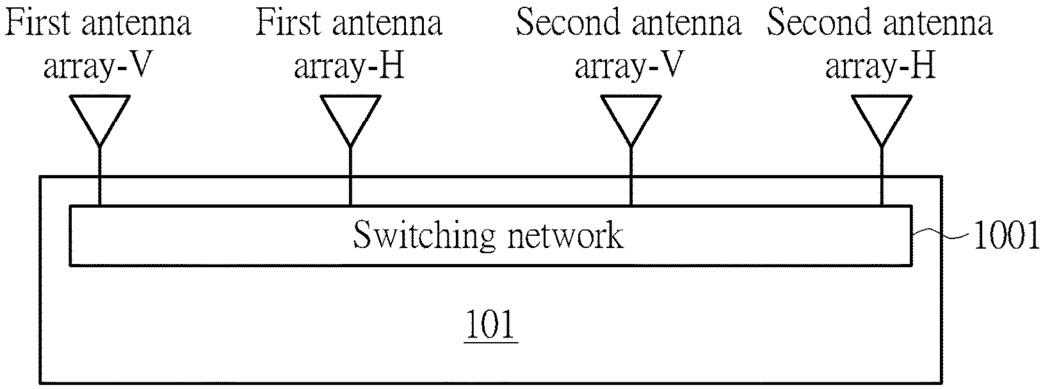
FIG. 10 is a schematic illustrating a switching network is provided to combine radiation of the first antenna array and the second antenna array, according to one embodiment of the present application.
Figure 10:
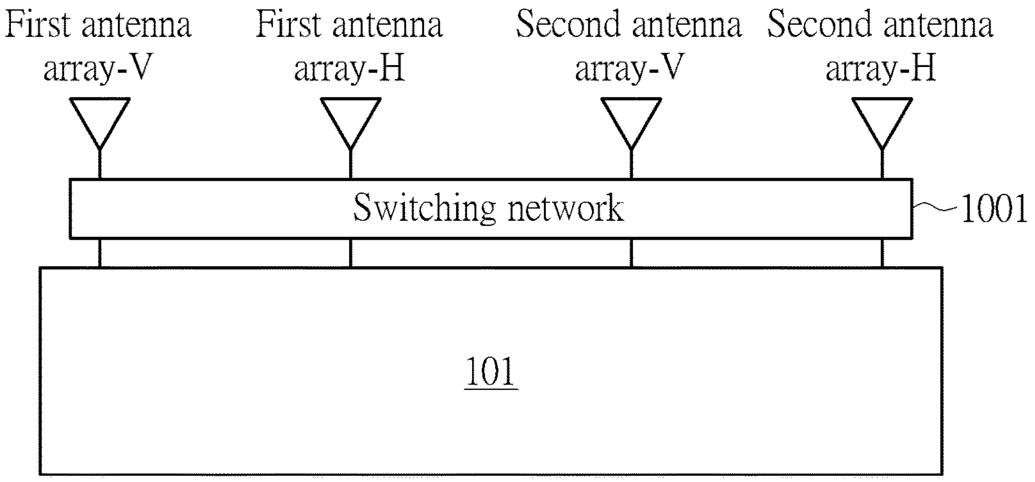
Figure 10:
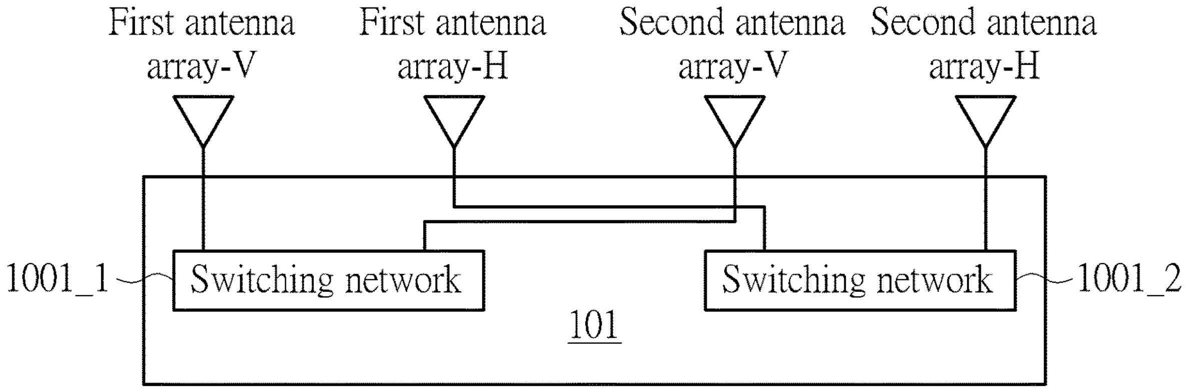

In one embodiment, the radiations of the first antenna array and the second antenna array can be selected and combined via a switching network. FIG. 10 is a schematic illustrating a switching network is provided to combine radiation of the first antenna array and the second antenna array, according to one embodiment of the present application. As shown in the example 1 of FIG. 10, a switching network 1001 is provided to select horizontal polarization or vertical polarization of the first antenna array, and to select horizontal polarization or vertical polarization of the second antenna array. For example, the vertical polarization of the first antenna array is selected, and the horizontal polarization of the second antenna array is selected. For another example, the horizontal polarization of the first antenna array is selected, and the vertical polarization of the second antenna array is selected. By this way, the antenna module 100 can have different radiation combination state.

In the example 1 of FIG. 10, the switching network 1001 is integrated to the communication circuit 101. However, the switching network 1001 can also be independent from the communication circuit 101, as shown in the example 2 of FIG. 10. Further, the number of the switching network 1001 is not limited to 1. As shown in example 3 of FIG. 10, two switching networks 1001_1 and 1001_2 are provided.

Figure 11:
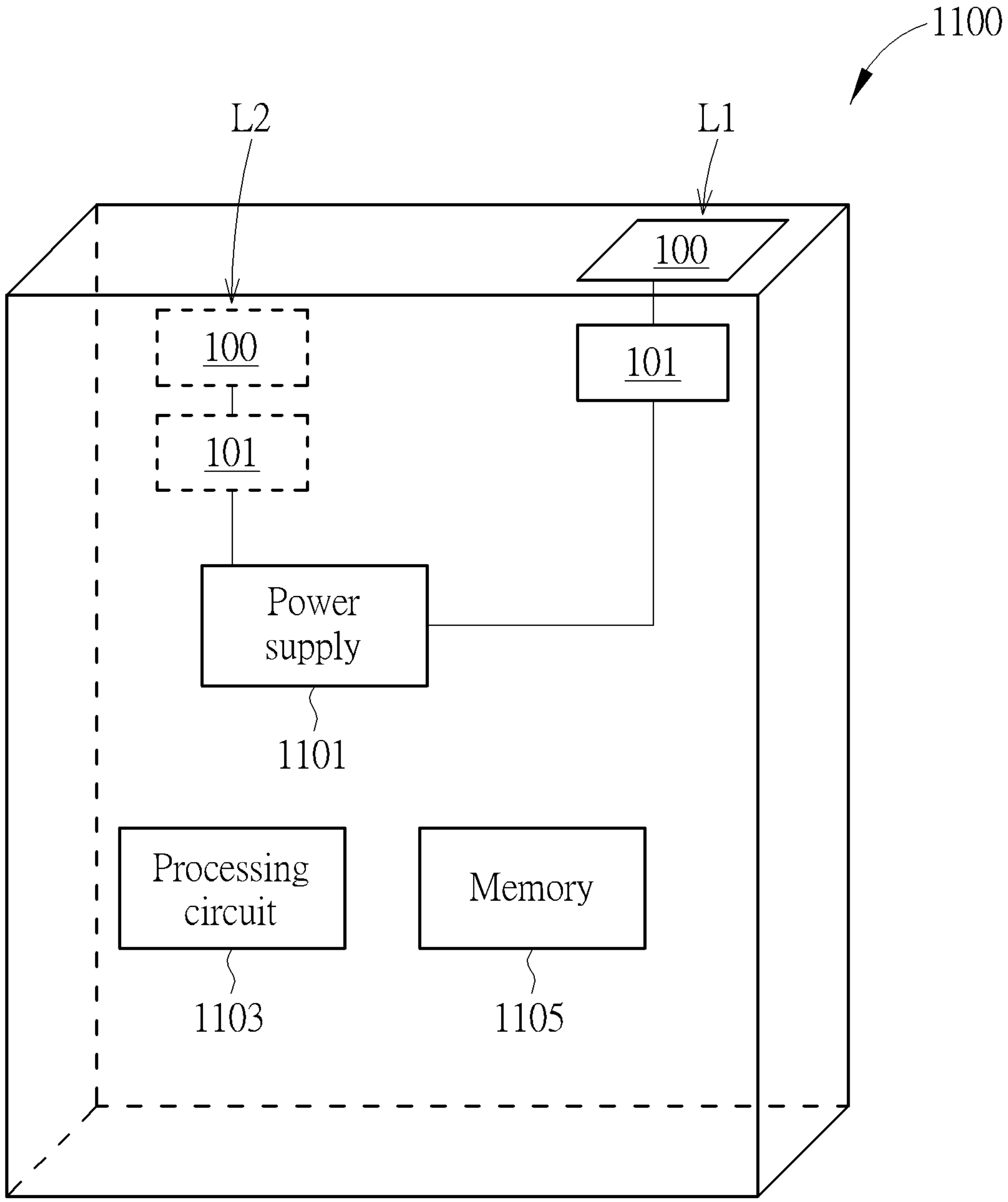
FIG. 11 is a schematic diagram illustrating a communication device, according to one embodiment of the present application.

The antenna modules illustrated in above-mentioned embodiments can be applied to a communication device such as a mobile phone or a tablet computer. FIG. 11 is a schematic diagram illustrating a communication device 1100, according to one embodiment of the present application. The antenna module provided by the present application can be located at any location of the communication device 1100 rather than limited to an edge of the communication device 1100, since antenna arrays thereof are provided on a single substrate. For example, as shown in FIG. 11, the antenna module 100 can be provided to the top of the communication device 1100 (the location L1), or be provided to the back of the communication device 1100 (the location L2). As above-mentioned, the antenna module 100 may be connected to a communication circuit 101, which is configured to receive signals or to transmit signals by the antenna module 100. The communication device 1100 can further comprise a power supplying device 1101, which is coupled to the antenna module 100 via the connector 103 shown in FIG. 1, to provide power to the antenna module 100. The communication device 1100 can comprise any required components, such as the processing circuit 1103 and the memory 1105. Details of the required components are omitted for brevity here.

In view of above-mentioned embodiments, the antenna module provided by the present application can have multi maximum radiation directions via antenna modules provided on a single substrate. Accordingly, the size and the cost the antenna module can be reduced, and signal loss caused by traces can be decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna module, comprising:

a substrate;

a plurality of first antenna arrays, located on the substrate, each of the plurality of first antenna arrays comprising a plurality of first antennas and having a first maximum radiation direction; and at least one second antenna array, located on the substrate, comprising a plurality of second antennas and having a second maximum radiation direction;

wherein each of the at least one second antenna array is located between different ones of the plurality of first antenna arrays, or a projection image of each of the at least one second antenna array is located between different ones of the plurality of first antenna arrays;

wherein a communication circuit is disposed below the substrate for coupling with the plurality of first antenna arrays and the at least one second antenna array; and wherein a connector for receiving power is disposed adjacent the communication circuit.

2. The antenna module of claim 1, wherein the plurality of first antenna arrays are broad side antenna arrays and the at least one second antenna array is an end-fire antenna array.

3. The antenna module of claim 1, wherein the at least one second antenna array is parallel with a side of each one of the plurality of first antenna arrays, or a projection image of the at least one second antenna array is parallel with the side.

4. The antenna module of claim 1, wherein the substrate comprises a first surface and a second surface, wherein the plurality of first antenna arrays are located on the first surface, and the at least one second antenna array is located on at least one of the first surface and the second surface.

5. The antenna module of claim 4, wherein a maximum length of the first surface is identical with a maximum length of the second surface.

6. The antenna module of claim 4, wherein a maximum length of the first surface is longer than a maximum length of the second surface.

7. The antenna module of claim 4, comprising a plurality of second antenna arrays, wherein the plurality of first antenna arrays on the first surface form at least two lines, wherein the plurality of second antenna arrays on the first surface form at least two lines and at least one of the plurality of second antenna arrays is located between two of the plurality of first antenna arrays.

8. The antenna module of claim 1, further comprising a metamaterial surface covering the plurality of first antenna arrays and the at least one second antenna array.

9. The antenna module of claim 1, further comprising at least one lens covering the plurality of first antenna arrays and the at least one second antenna array.

10. The antenna module of claim 1, further comprising a molding layer, wherein the molding layer covers at least one of the plurality of first antenna arrays and the at least one second antenna array, or covers all of a surface of the substrate which the plurality of first antenna arrays are provided on.

11. The antenna module of claim 1, further comprising a switching network configured to combine radiation of the plurality of first antenna arrays and the at least one second antenna array in different radiation directions.

12. The antenna module of claim 11, wherein the switching network is integrated to the communication circuit or independent from the communication circuit.

13. An antenna module, comprising:

a substrate;

a plurality of first antenna arrays, located on the substrate, each of the plurality of first antenna arrays comprising a plurality of first antennas and having a first maximum radiation direction; and at least one second antenna array, located on the substrate, comprising a plurality of second antennas and having a second maximum radiation direction;

wherein each of the at least one second antenna array is located between different ones of the plurality of first antenna arrays, or a projection image of each of the at least one second antenna array is located between different ones of the plurality of first antenna arrays;

wherein a communication circuit is disposed below the substrate for coupling with the plurality of first antenna arrays and the at least one second antenna array;

wherein a connector for receiving power is disposed adjacent the communication circuit; and wherein each of the plurality of first antenna arrays has a combined polarization which has two directions of polarization in a single one of the plurality of first antenna arrays, and each of the at least one second antenna array has two directions of polarization in two separate ones of the at least one second antenna array.

14. An antenna module, comprising:

a substrate;

a plurality of first antenna arrays, located on the substrate, each of the plurality of first antenna arrays comprising a plurality of first antennas and having a first maximum radiation direction; and a plurality of second antenna arrays, located on the substrate, comprising a plurality of second antennas and having a second maximum radiation direction;

wherein each of the plurality of second antenna arrays is located between different ones of the plurality of first antenna arrays, or a projection image of each of the plurality of second antenna arrays is located between different ones of the plurality of first antenna arrays;

wherein a communication circuit is disposed below the substrate for coupling with the plurality of first antenna arrays and the plurality of second antenna arrays;

wherein a connector for receiving power is disposed adjacent the communication circuit; and wherein one of the plurality of second antenna arrays is parallel with a first side of each of the plurality of first antenna arrays and another of the plurality of second antenna arrays is parallel with a second side of each of the plurality of first antenna arrays, such that the first side and the second side are perpendicular with each other.

* * * * *